United States Patent [19]
Canaud et al.

[11] Patent Number: 4,822,649
[45] Date of Patent: Apr. 18, 1989

[54] MULTIPLE GLAZING, METHOD FOR OBTAINING SAME AND DEVICE FOR USING SAID METHOD

[75] Inventors: Michel Canaud, Paris; Philippe Dewitte, Thourotte, both of France

[73] Assignee: Saint-Gobain Vitrage, Aubervilliers, France

[21] Appl. No.: 17,218

[22] Filed: Feb. 20, 1987

[30] Foreign Application Priority Data

Feb. 20, 1986 [FR] France .................. 86 02344
Dec. 24, 1986 [FR] France .................. 88 18184

[51] Int. Cl.⁴ .................. E06B 3/24; E06B 7/12; B32B 27/36; B32B 27/00
[52] U.S. Cl. .................. 428/34; 428/412; 428/423.1; 428/423.3; 52/172; 52/304; 52/781; 52/788
[58] Field of Search .................. 428/34, 412, 423.1, 428/423.3; 52/172, 304, 781, 788

[56] References Cited

U.S. PATENT DOCUMENTS

| | | | |
|---|---|---|---|
| 3,791,910 | 2/1974 | Bowser | 428/34 |
| 3,822,172 | 7/1974 | Rullier | 428/34 |
| 3,832,254 | 8/1974 | Bowser et al. | 428/34 |
| 3,919,023 | 11/1975 | Bowser et al. | 428/34 |
| 4,074,480 | 2/1978 | Burton | 428/34 |
| 4,584,229 | 4/1986 | Bourelier et al. | 428/216 |
| 4,622,249 | 11/1986 | Bowser | 52/788 |

FOREIGN PATENT DOCUMENTS

| | | | |
|---|---|---|---|
| 1172810 | 6/1964 | Fed. Rep. of Germany | 428/34 |
| 2140834 | 8/1971 | Fed. Rep. of Germany | 428/34 |
| 2457475 | 6/1976 | Fed. Rep. of Germany | 428/34 |

OTHER PUBLICATIONS

*Glass and Ceramics* (1980), vol. 37, Nos. 1-2, pp. 16, 18, "Airtight Sealing Materials for the Manufacture of Double Glass Sheets"; S. M. Komskii et al.

*Primary Examiner*—Ellis P. Robinson
*Assistant Examiner*—P. J. Ryan
*Attorney, Agent, or Firm*—Oblon, Fisher, Spivak, McClelland & Maier

[57] ABSTRACT

The invention relates to multiple glazing, a method of obtaining the same and a device for using said method. The glazing contains two sheets of glass separated by a space of dehydrated air and maintained by a cross-braced frame, of which at least the surface in contact with the glass is butyl and/or polyisobutylene rubber-based mastic and is covered with a peripheral injection, which adheres in a cohesive maner to the mastic of the cross-braced frame.

18 Claims, 5 Drawing Sheets

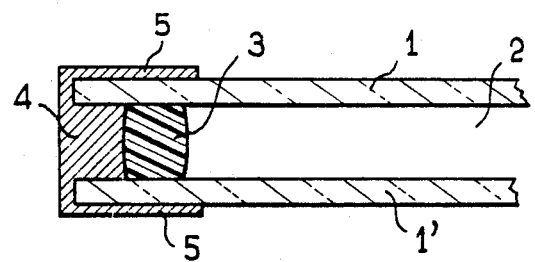
FIG_1a
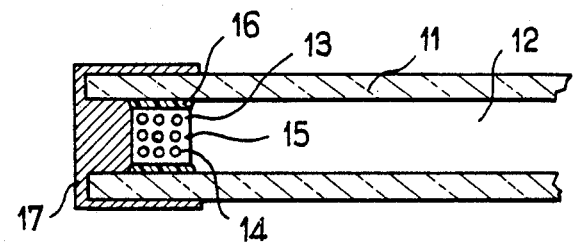
FIG_1b
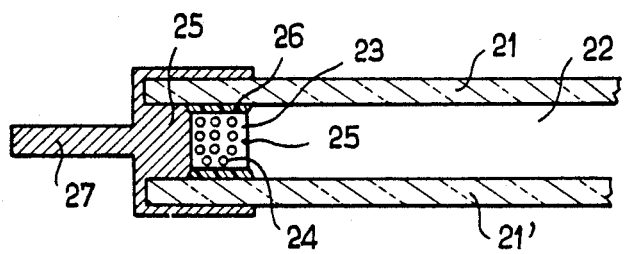
FIG_1c
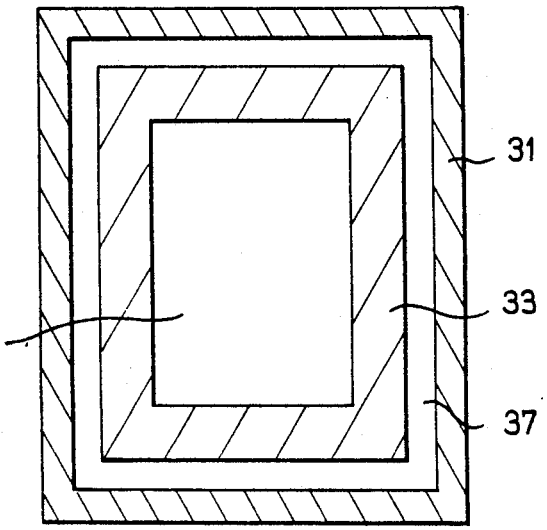
FIG_2

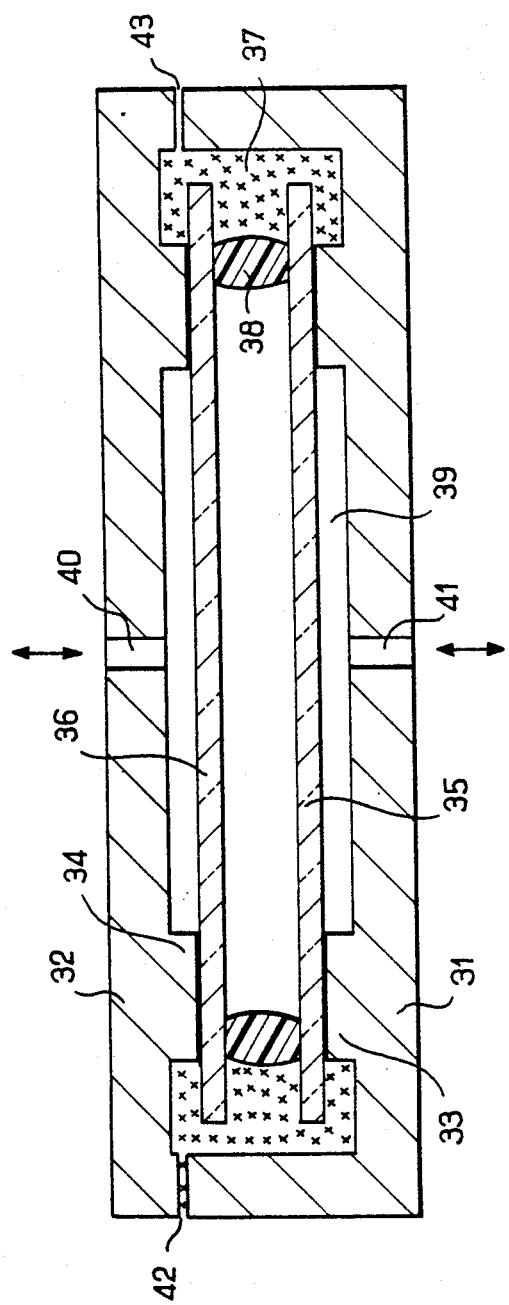
FIG._3

MULTIPLE GLAZING, METHOD FOR OBTAINING SAME AND DEVICE FOR USING SAID METHOD

BACKGROUND OF THE INVENTION

1. Field of the Invention:

The present invention relates to multiple glazings formed from at least two sheets of glass separated by a gas space, generally air, providing heat insulation. The invention also relates to a technique for obtaining such multiple glazings.

2. Discussion of the Background

Double glazing, or more generally multiple glazing, is gradually equipping the majority of recently constructed or older dwellings due to the improvement in heat and/or acoustical comfort and the energy savings which it provides.

Diffusion of double glazing, however, runs into a two-fold problem:

(a) first, it is still frequently a craftsman-like product with multiple manufacturing steps and is, therefore, relatively expensive, (b) second, this type of glazing is difficult to adapt to old frames whose grooves only allow the introduction of a single sheet of glass.

Present double glazing is basically of two types which can be differentiated by the type of interposed cross-braced frame which maintains the sheets of glass apart.

In accordance with a first type, the cross-braced frame is composed of rigid metal profiles joined together, which are, for example, aluminum. In this case, the frame does not adhere to the sheets of glass and does not act as a seal, which is provided by the in situ injection of a peripheral polymerizing joint, for example polysulfide.

An improvement in this type of glazing with a rigid cross-braced frame is obtained if an organic joint is interposed between the frame and the glass, for example a polyisobutylene and/or butyl rubber-based joint, which essentially guarantees a seal against water vapor, with a second joint, for example in polysulfide which is more water-impermeable, reinforcing the seal. This type of double glazing, which for example is sold by Applicant under the trademark Polyglass ®, performs very well because it is remarkably water-tight but is relatively expensive.

For its manufacture, a frame with the dimensions of the glazing must be produced by fitting profiles together, filling the profiles with a drying agent, such as a molecular sieve, coating their two opposite external surfaces with a polyisobutylene and/or butyl rubber-based mastic, placing the frame prepared in this manner between two sheets of glass, injecting a peripheral joint, for example of polysulfide into the groove defined by the edges of the two sheets of glass on each side of the profile and polymerizing the polysulfide.

A second type of double glazing is composed by glazing not having a rigid cross-braced frame, but two peripheral joints, that is, an interior butyl rubber-cased cord which also acts as a separator for the sheets of glass and an exterior polysulfide joint. This type of glazing, sold by Applicant under the trademark Biver ® and described, in particular, in French Pat. Nos. 2,294,313 and 2,294,140, enables automated industrial manufacture by replacing the manual operation of fitting together the profiles with automated in situ extrusion of a cord.

In addition, the butyl rubber-based cord, which is also called the butyl cord, adheres to the glass and forms a first sealing barrier. Therefore, as in the case of Polyglass ®, this guarantees a longer life for the glazing which is exposed on the one hand to the infiltration of rain water, in the case of a damp atmosphere, particularly when used for kitchens, bathrooms, etc., and to variations in climate, which, depending on the outside temperature, cause the interposed sheet of gas to dilate or to contract, thus producing breathing of the glazing which basically makes it fragile at the sealing joints.

This breathing of the multiple glazing constitutes a general problem for all multiple glazing and requires great precautions at the time of laying the peripheral joints so as to prevent leaks at the glass-joint interface, particularly in the angles. Care should also be taken to ensure that air bubbles are not imprisoned at the interface of the joints, bubbles which by expanding and contracting in turn could lead to a loss in sealing.

These manufacturing defects, the practical consequences of which only occur a few years after the final placing of the glazing can only be overcome by using very qualified personnel and staff responsible for checking the quality of the work after the manufacturing step; in other words, using an expensive infrastructure.

SUMMARY OF THE INVENTION

The principal object of the present invention is to provide a new type of multiple glazing which is certain to provide perfect sealing without increased checking being necessary.

A further object of the invention is to provide a method of maufacturing the new type of multiple glazing which assures quality manufacturing yet reduces costs.

Another object of the invention is to provide a device with which to carry out the method of the present invention which is economical and yet versatile enough to produce several embodiments of the multiple glazing of the present invention.

These objects and other objects of the present invention have been achieved by the present multiple glazing, comprising:

two or more sheets of glass separated by an interposed gas space, wherein said glass sheets are maintained mutually substantially parallel by means of a cross-braced frame and a peripheral joint, said cross-brace frame comprising butyl rubber or polyiosbutylene-based mastic at the contact surface between said glass sheets and said cross-braced frame, and wherein said peripheral joint comprises a plastic capable of adhering in a cohesive manner with said butyl rubber of said polyisobutylene-based mastic, and by the method of producing said multiple glazing and the device for performing said method disclosed herein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 illustrates a vertical cross-section of different types of multiple glazing in accordance with the invention (FIGS. 1a, 1b, 1c).

FIG. 2 shows a diagram viewed from above of a mold enabling the production of glazing as in FIG. 1, FIG. 3 illustrates a vertical cross-section along plane A—A of FIG. 2.

DETAILED DESCRIPTION OF THE PREFERRED EMBODIMENTS

Figure 4:
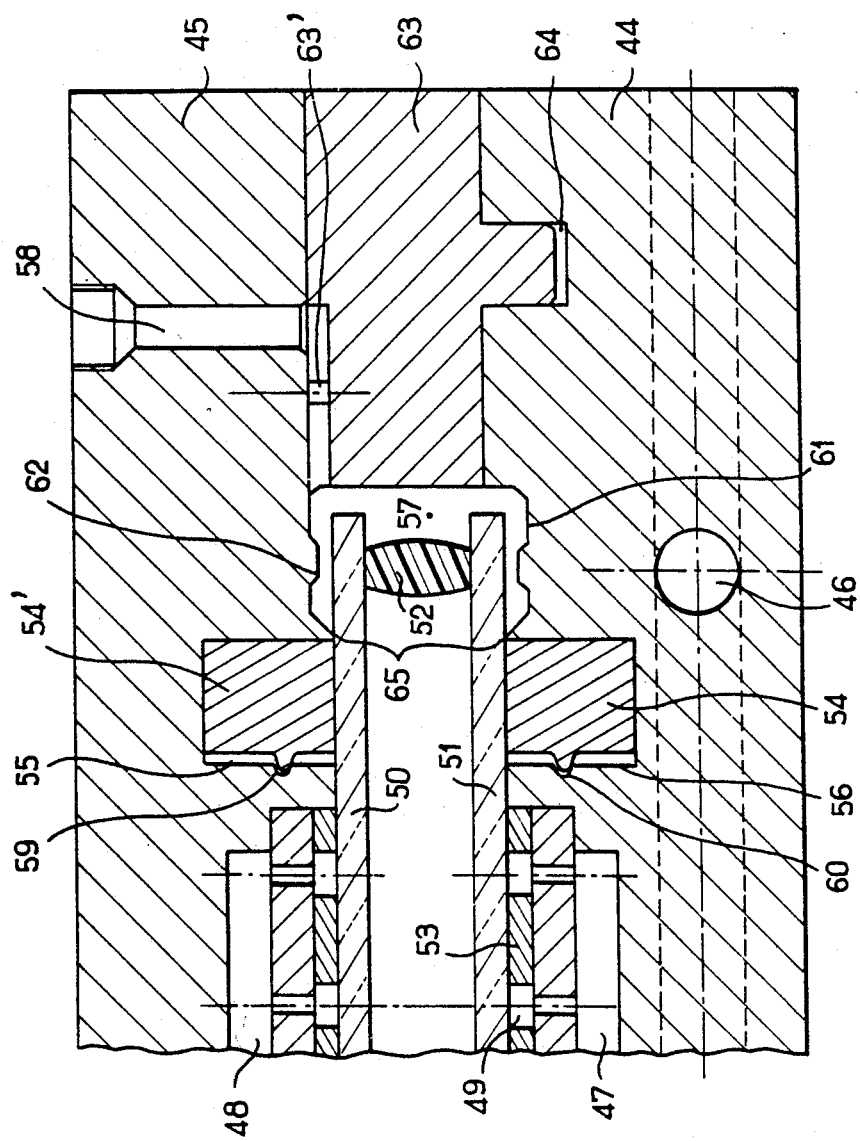
FIG. 4 illustrates a vertical cross-section of a mold in accordance with the invention, more particularly adapted to injection under low pressure.

The multiple glazing in accordance with the invention contains a perfectly continuous double sealing barrier, with the second sealing joint adhering in a cohesive to the first of the sealing joints.

By butyl rubber and/or polyisobutylene based mastic is meant a mastic which remains permanently malleable, as is described in French Pat. No. 2,294,313. Such a mastic can perfectly assure the separation of two glass sheets during the period of a few hours, which is much more than the time necessary to completely make the multiple glazing. However, it cannot be used as a spacer during the whole life of the glass product, that is, 10 years minimum. The exterior peripheral joint serves equally, therefore, as a spacer, since in collaboration with the cross-braced frame, it must fit in the area between the sheets of glass in the one hand, and as the cross-braced frame on the other hand.

In accordance with the invention, the exterior peripheral joint is such that it adheres in a cohesive manner onto the interior joint, or the organic part of said interior joint, which, for example, is polyisobutylene and/or butyl rubber-based. "Adheres in a cohesive manner" is used to mean the production of bonds such that the separation of the two materials is impossible, unless one of them is destroyed. The problem of the interface between the two joints is therefore solved by an interpenetration of the materials at the interface, without however, removing the principle of a double sealing barrier.

This can be obtained by using as an exterior peripheral joint, the in situ condensation product of a reactive mixture composed of at least two reagents in the liquid state, whose fluidity is close to that of water under normal conditions of temperature and pressure. The peripheral joint is thus a liquid, fixed by the polymerization reaction but which, before this reaction takes place, can occupy the smallest spaces.

The injection pressure of the reactive mixture is sufficient for no air bubbles to be imprisoned at the interface between the joints. Such was not the case with the sealing mastics of the prior art, such as polysulfides or silicon elastomers, whose viscosity at the moment of their injection through a nozzle turning around the glazing is fairly comparable to that of molasses. These mastics required very elaborate methods of use.

The condensation product is preferably a polyurethane produced from the reaction of a polyisocyanate and a polyol. Preferably, an aliphatic polyisocyanate is used, which practically eliminates any ultra-violet sensitivity of the polyurethane.

The polyurethane must have an instanteous Shore hardness of between 50 and 70 Shore A, stretching to rupture of 400% at 20° C. and low permanent deformation on compression.

Preferably the reactive mixture is such that the condensation reaction takes place in an optimum time at a temperature of between 40° and 70° C.

In accordance with a further particularly preferred characteristic of the invention, the external peripheral joint fills not only the groove defined by the two sheets of glass on the one hand and the internal joint on the other hand, but also covers the peripheral part of the external surfaces of the glass, thus masking all or part of the joints.

This arrangement is particularly preferred for the many advantages which are obtained. First, it improves the water-tightness at the joint-glass interface, which is systematically the weak point of any multiple glazing. It should first be noted that, since in accordance with the invention it is obtained by in situ condensation of a liquid mixture, the polyurethane joint closely follows the contours of the glass and there is, therefore, a suction effect which contributes to the sealing of the joint-glass interface. In addition, as soon as the polyurethane joint is placed on either side of the sheets of glass, the path which water must follow before reaching the second joint, which it must then still traverse, is thus greatly lengthened, such that the probability of infiltration is further decreased. In addition, the problem posed by the successive contractions and expansions of the sheet of interposed gas, which has already been mentioned, causes "breathing" of the glazing. If, as in accordance with the preferred characteristic which is developed herein, the polyurethane joint is placed covering the glazing, the breathing phenomenon is selfcompensated.

In effect, in the case of contraction of the glazing, the part of the peripheral joint which is inside the multiple glazing is placed in a compressed state and strongly repels infiltrations. On the other hand, in the case of expansion, the sheets of glass tend to separate mutually and, in this case, the part of the peripheral joint which is outside the glazing prevents this movement. In all cases, part of the joint has an increased barrier role.

To this sealing aspect, an aspect of protection for the glazing is added, more particularly for the edges, especially for the possibility of stacking the glazing one on top of the other without having to interpose wedges between them, since the glazed surfaces are not in contact with one another due to the overthickness of the joint and also are less fragile. This greatly facilitates all the operations of on-site handling and laying.

Finally, there is an esthetic aspect, with the exterior part of the polyurethane joint masking its own interior part and the first internal joint and capable of being either tinted or painted to match the frames.

The invention also provides a method for manufacturing double glazing with a continuous double barrier. This method is characterized in that, in a first step, a temporary double glazing is produced in a known manner, the double glazing formed by two parallel sheets of glass maintained in separation by a crossbraced frame, of which at least the surface in contact with the sheets of glass is butyl rubber and/or polyisobutylene-based and in that, in a second step, a heated mold is placed around the area of the edges of the temporary glazing thus defining over the entire periphery of the glazing a cavity which is then rendered sealed by exerting traction on each sheet of glass and into which the reactive mixture is injected.

This method of placing the exterior peripheral joint comprises two essential characteristics:

(1) the so-called reactive injection mold and, (2) the glazing is maintained under traction throughout the molding operation.

Reactive injection molding signifies that the reactive mixture is introduced in the liquid state and, due to its fluidity, occupies all the available space, all the empty spaces, and exactly follows the contours of the glass and in particular of the cross-braced frame while preventing the imprisonment of air bubbles at the interface of the two joints.

A further advantage of the reactive injection molding method is that it enables handling of the glazing upon release from the mold without fear of them sticking together or becoming scratched. In other words, the glazing is immediately usable, whereas for the preparation of a double glazing comprising a peripheral polysulfide or silicon joint, the joint must first be injected with a nozzle turning for example around the glazing, then the joint must be polymerized for a time which is never less than one and one-half hours and often on the order of 12 or even 24 hours, either in a an oven or in a chamber at room temperature where the glazing must be taken using great precautions. Further, the joint before polymerization has the consistency of molasses as has already been indicated.

The second characteristic of the method in accordance with the invention is that the glazing is placed in a state of traction during the molding of the peripheral joint, which ensures that the glazing presses against the mold. Preferably, this traction is exerted by vacuum suction, but other means, in particular mechanical means, are also capable of being used.

This characteristic can be used because Applicant has noted experimentally that, in a surprising manner, the butyl rubber and/or polyisobutylene-based joints do not then react by becoming detached from the glass but by becoming thinner in their central part. The seal created between the mold and the glass does not therefore create a leak at the cross-braced frame.

The method in accordance with the invention enables this property of the butyl rubber and/or polyisobutylene-based joints to be used to advantage. Thus, by vacuum drawing it is possible to extend the thickness of the cord by close to 20%. This extension may, if necessary, go up to close to 25% by using auxiliary mechanical drawing means such as suction cups placed on the two opposite surfaces of the double glazing. This can be very useful for the manufacture of multiple glazing in which the interposed air space has a thickness of more than 20 mm, for example. Glazing of this type would otherwise require great precautions to be taken when laying the butyl rubber cord.

On the other hand, the closing of the mold can be used to reduce the thickness of the interior cord by compression and can preferably be substituted for the operation of pressing the sheets of glass.

The method in accordance with the invention enables an interior cord to be obtained which is perfectly sized just as the exterior template conforms perfectly three-dimensionally to the desired template.

The injection of the reactive mixture can, depending on its reactivity, be carried out at high or low pressure. At high pressure, which is approximately 200 bars, the time for injection and setting are extremely short, preferably less than 1.5 seconds, which enables very high rates of production. The products used for the method are selected for example from among those proposed for the encapuslation of automobile glasses using the RIM (reactive injection molding) process, for which the thread time is on the order of 2 seconds.

The injection can also be carried out at low pressure. Low pressure here means a pressure below 100 bars, preferably between 3 and 7 bars, for an injection time of more than 60 seconds, used with reactive mixtures whose thread time is a few minutes and preferably on the order of 90 seconds. At low pressure the molding cavity in which the injection is carried out is preferably placed under lower pressure in order to assist the evacuation of the air. In this case, the method is much less rapid, but it is much simpler then sealing the injection cavity so that the machining tolerances of the mold are greater. This of course translates into a lower cost. In addition, the reactive mixtures can then be tinted in the mass.

The invention also relates to a device for using the above-described molding method. This device is composed on the one hand by a mold with an internal cavity having the shape of the external peripheral joint, an injection lip and air holes which are intended for the removal of the air present in the cavity and which are located on the edge of the mold opposite the edge containing the injection lip. The mold only covers the areas of the edges of the multiple glazing so as to enable the means for traction of the sheets of glass to come closer to the central parts. These traction means are preferably composed of chambers which are capable of being placed under reduced pressure using a slight vacuum. The mold preferably contains a mixing chamber, located downstream of the injection lip, which is thin so as to enable manual removal of the polymerizing plastic in the mixing chamber.

Glazing in accordance with the invention, as shown in FIG. 1a, comprises two sheets of glass 1, 1', which are parallel and kept separated by a dehydrated air space 2. The sealing and the spacing are provided by two plastic cords 3 and 4.

The interior cord 3 is composed of an elastomer extruded in the form of a cord directly onto the glass and is of the rocking type in butyl rubber and polyisobutylene as described in French Pat. No. 2,294,313. Due to its composition and its relatively high temperature shortly after its extrusion, the butyl rubber adheres well to the glass and constitutes a first sealing barrier. In addition, it contains large quantities of a dehydrating agent, particularly of the molecular sieve type and thus ensures the water-tightness of the interposed air space 2.

After the laying of the interior cord 3 at, for example, 14 mm from the edge of the sheet of glass 1, sheet 1' is put in place. This causes no immediate deformation of the cord due to the high shock resistance of the butyl rubber. As the butyl rubber has a slight tendency to become detached from the glass in the presence of liquid water and remains permanently fairly pliable and sensitive to creepage, it must be covered and a permanent spacer and a water-tight joint be placed. This triple function is provided by peripheral joint 4.

In accordance with the invention, this peripheral joint 4 is composed of an organic polymer which adheres in a cohesive manner to the butyl rubber-based cord during its polymerization. Polyurethane is preferably used which is a condensation product of a mixture of polyols and polyisocyanates.

For quality double glazing, it is necessary for the polyurethane to have an instanteous hardness of betwen 50 and 70 Shore A. The instanteous hardness is measured with a hardness meter under DIN 53505 and ISO R868 standards; the value indicated corresponds to the highest observed deviation of the needle of the hardness meter. In addition, its remanent compression deformation must remain below 25% after a test for 24 hours at 70° C.

After polymerization, the polyurethane should preferably have an amount of dry material of greater than 97%. In this manner, no chemical dewpoint appears due to the condensation of the solvents present in the joint.

In order to assist the formation of strong cohesive bonds between the polyurethane joint and the butyl rubber-based joint, it is preferable to have good thermal homogeneity. Since the polyurethane peripheral joint is generally molded directly after the laying of the interior butyl rubber-based cord, that is at a time when the butyl cord has a temperature close to 40°-70° C., a polyurethane is preferably selected whose optimal temperature of polymerization by reactive injection is within that temperature range.

If high pressure is used, a polyurethane is preferably used which has a thread time of less than 2 seconds, with the thread time being the moment starting from the initial mixture of polyol-isocyanate based compounds from which the degree of reticulation of the polyurethane is such that its viscosity allows a continuous thread to be drawn.

Tests have been carried out using a formula prepared by B.A.S.F. bearing reference BS RIN 40/165. This formula is a mixture of a compound A (polyols), whose viscosity measured on a Faake ® viscosimeter is 1450 MPa/sec at 25° C., with its density then being 1.03, and a compound B (isocyanates), in which the percentage of free isocyanate groups is 26.5 (% NCO), the viscosity at 25° C. measured on an Epprecht ® viscosimeter is 90 MPa/sec and the density is 1.215. The weight ratio of the mixture A and B is 100 to 28. The reactive mixture, injected under a pressure of 200 bars for 1.5 seconds, gives a joint whose physical characteristics include an instanteous hardness of 50 Shore A, breakage constraint at 20° C. of 20.4 MPa and stretching to breakage at 20° C. of 450%.

Double glazing, prepared using the above mixture and with a butyl rubber-based interposed cord, was placed after 21 days of aging in a high humidity oven (55° C.-95% humidity). Reference double glazing, with a polysulfide peripheral joint, was placed under the same conditions. On the first day, the two glazings had a same dewpoint at $-45°$ C. Fourteen days later, the dewpoint was $-65°$ C. for the multiple glazing in accordance with the invention and $-54°$ C. for the glazing with the polysulfide joint. This decrease in the value of the dewpoints is explained by the heat activation of the dehydrating agents which the buty rubber-based cords contain. After 28 days, the dewpoint of the glazing with the polysulfide joint remained unchanged, whereas the dewpoint of the glazing with the joint in molded polyurethane was below $-70°$ C. These values then remained unchanged until the 98th day, when the test was stopped. This test shows the very remarkable sealing of the glazing in accordance with the invention, knowing that a glazing with a dewpoint below $-40°$ C. is already considered as satisfactory.

In addition, after this cycle of 98 days, it was still impossible to separate the polyurethane joint from the butyl rubber-based joint without destruction of one of the joints.

Substantially identical characteristics are obtained using reactive mixture formulas for reactive injection molding based on aliphatic isocyanates such as those supplied by Recticel, which have the advantage of better ultraviolet resistance than the polyurethane.

If low pressure is used, a polyurethane is preferably selected whose thread time is less than 2 minutes, such as, for example, that sold by Revco under the name Revorin ® 20A (Labo I 0021/001 A and I 0021003b). This mixture contains a polyol-based compound A, of the polyether type, whose volume on the pyknometer at 23° C. is 1.05 g/cm$^3$, Brookfield viscosity is 710 CPS and the dry extract greater than 98% after 3 hours at 105° C. The second isocyanate-type compound B is called Revorin ® 20B (Labo I 0021/003B) with a volume on the pyknometer at 23° C. of 1.12 g/cm$^3$ and likewise a dry extract greater than 98%. A mixture in a weight ratio A/B =53.8/46.2 has an unmolding time of 1.5 minutes at 23° C.

Such polyurethanes fully guarantee the triple function given to the peripheral joint, but it should be noted that this triple function is not specific to molded polyurethane-type plastic joints. In effect, this is provided in prior art glazing by polysulfide-type injected plastic joints. However, a molded polyurethane-type plastic joint has advantages both with regard to the product obtained and with regard to the manufacture of this product.

From the point of view of the final product, a multiple glazing as is shown in FIG. 1a, has remarkable sealing due, on the one hand, to the impermeability of polyurethane and, on the other hand, to the obstacles placed in the path of the water up to the interior cord. In effect, the glass-joint interface constitutes a choice path for infiltrations but with a molded joint, the thickness of this leak is already reduced due to the fact that the joint follows perfectly the micro-contours of the surface of the glass and is pressed thereagainst like a suction cup. In addition, if, as shown here, the molded polyurethane joint has wings 5 which in part cover the exterior surface of the glazing, the path which the water must follow up to the cord is considerably increased such that the probability of its succeeding in penetrating is strongly reduced. Such a configuration also enables the interior cord to be masked.

A further advantage comes from the fact that the exterior dimensions of the overmolded glazing correspond exactly to the dimensions of the mold and are therefore perfectly defined whereas it is sometimes difficult to perfectly achieve the dimensions of the sheets of glass. It is also very advantageous to be able to obtain a single exterior dimension of the glazing for a whole range of thicknesses of air spaces and sheets of glass. This, for example, allows a choice between various types of heat or even sound insulation to be offered on the basis of a single frame.

It should be noted that the edges of the multiple glazing which are more especially fragile and injurious, are thus protected, which facilitates stocking, handling and laying of the glazing which can even withstand shocks.

FIG. 1b shows a double glazing compound of two sheets of glass 11, 11' separated by a dehydrated air space 12 or possibly by any other gas selected for its insulating property. This interposed space 12 is defined by rigid profiles 13, comprising for example aluminum. These profiles contain large quantities of a dehydrating agent 14, for example in the form of molecular sieve bearings and in contact with the interposed air space through slit 15. Sealing between the sheets of glass and the profiles is obtained by the deposit of a fine interposed cord 16 formed of a polyisobutylene and/or butyl rubber-based mastic. It is therefore possible to use a polymerizing reactive mixture to provide joint 17. Such glazing is of comparable quality to the preceding one from the point of view of sealing and life span. Its cost is greater but, on the other hand, it is well suited for custom work, such as a renovation for example.

It is within such a framework that glazing of the type shown in FIG. 1c is more especially used. This glazing contains various elements (21, 21', 22, 23, 24, 25, 26 and 27) corresponding to the elements (11, 11', 12, 13, 14, 15, 16 and 17) of the glazings of the preceding type, but which are more especially characterized by a projection 28 of the molded joint 27, which projection is more especially intended for mounting in old grooves intended solely to receive single glazing. A single projection has been shown, but it is possible to provide several in any desired shape.

It should be noted that nothing prevents such projections with a glazing of the type shown in FIG. 1a or any other projections enabling, for example, mounting of the glazing in dry grooves.

The combination of the covering wings 5 and the use of the peripheral joint and the projections of any type 28 enable multiple glazing to be obtained wherein that which we will call the peripheral mounting part, i.e., the useful mounting zone intended to be placed in a groove and held in place therein, is of a size which is perfectly independent from the thickness of the bay itself, that is of the thickness of the air space and the sheets of glass.

In addition, mounting of the bay, whether for renovation or even new construction, can be by a careful very simplified placement of the projections 28; the glazing can then be directly nailed or screwed on the frame.

A further particularly original characteristic of the multiple glazing in accordance with the invention comes from its method of manufacture, which is described by reference to FIGS. 2 and 3.

After having been assembled, the assembly formed of two sheets of glass and the interior butyl rubber and/or polyisobutylene-based cord is placed in a mold, a diagram of the principle of which is given viewed from above (FIG. 2) and in cross-section (FIG. 3).

The mold used contains a lower component 31 and an upper component 32 which is capable of being removed to enable the introduction and the removal of the multiple glazing. Each half-mold contains a foot 33 (34 respectively) on which the glass sheet 35 (36 respectively) is supported and which defines over the entire periphery of the glazing a groove 37 into which the reactive mixture is injected. Since the two sheets of glass are at least partially separated by a butyl rubber and/or polyisobutylene-based cord 38, the sealing between the glass and the mold at the feed 33 and 34 cannot be obtained by compression without crushing cord 38. To overcome this, a low pressure chamber 39 is provided by means of channels 40, 41 in which a slight vacuum is applied which is created for example by means of a vacuum pump, not shown here, which maintains the glass up against the feet 33, 34.

It should be noted that the channels 40, 41 also allow the introduction of the air under pressure at the end of the molding operation so as to facilitate the detaching and removal of the finished glazing.

In accordance with a particularly important characteristic of the invention, the vacuum created in the low pressure chamber 39 can be used to modify or adjust the thickness of the interposed butyl rubber-based cord so as to render it perfectly functional with a nominal thickness. In effect, if the vacuum is used to separate the sheets of glass, a reduction in the thickness of the cord is obtained without any modification in its surface in contact with the glass and therefore without any consequence in the degree of sealing provided by the joint. This property can possibly be used for the manufacture of double glazing with air spaces on the order of 2 cm for example. It also overcomes problems likely to be caused by a possible creeping of the interior cord.

Conversely, the cord can be compressed at the moment of closure of the mold. Therefore, it is useless to press the sheets of glass against the butyl rubber-based cord upon constitution of the provisional multiple glazing, the pressing being preferably carried out at the moment of closing the mold.

Each half-mold 33, 34 is provided with uniform heating means; half-molds provided with circulation of a heat-bearing fluid, such as oil, are preferably used.

The injection is carried out through the injection lip 42 located on one of the sides of the mold, between the two half-molds 31 and 32. This lip is preferably extremely fine and consequently grossly schematized on the drawing for greater clarity. Above the injection lip 42 is a mixing chamber which is of the type commonly known as a "carp tail". This chamber is supplied by a static mixer and an injection pump. These various components are well known in the art and are not shown here.

The air present in the cavity defined by the two half-molds 31, 32 escapes through vents 43 placed on the side of the mold opposite the injection edge. These vents 43 are preferably at a higher level than that of the injection lip 42. For this, the mold is inclined at an angle of a few degrees in relation to the horizontal, even up to 30°, with the injection edge then being at the bottom.

The mold which has just been described is more particularly suitable for high pressure injection of the reactive mixture, with a so-called RIM machine, such as that offered by Krauss Kaffei, which provides a perfect mixture of the reagents and requires no rinsing or cleaning of the mixing chamber and with which any obstruction of the mixing head by the reactive mixture is impossible, even with prolonged production times.

The exterior surface of the glass destined to be covered by the polyurethane molded joint can be treated with a primer or an adhesion promoter, for example with a solution of 1% saline in ethanol. The use of such a primer is not necessary and moreover only the exterior surface of the glass, which is very easily accessible, can receive this treatment, such that the priming poses no particular difficulty.

An unmolding agent, for example of the Acmos Fluoricon ® 35-20 type, which is a mixture of wax and white spirit, is preferably pulverized onto the walls of the mold. This unmolding agent can also be a polyurethane paint, which thus enables a glazing to be provided with a colored joint, for example white, since the joint is naturally black.

When the injection of the reactive mixture is carried out under a pressure below 10 bars, preferably between 3 and 7 bars, a mold is preferably used whose injection zone is schematized in FIG. 4. This mold can moreover also be used for high pressure injection with the limitations specified in the following description.

The lower 44 and upper 45 molds are heat-insulating due to an interior circuit 45 which is traversed by a heat-insulating liquid—water or oil—at for example 60° C. As above, they are provided with reduced pressure chambers 47, 48 which act, by means of channels 49, on the glass sheets 50, 51 of the insulating glazing which, at this stage, contains only a peripheral butyl rubber joint 52. For a softer contact with the glass, the channels 49 traverse rubber pads 53. To prevent the sheet of glass from slipping at the moment of or after the closure of the mold, incompressible molded plastic blocks 54, 54' are provided which are made for example of a polyurethane with suitable hardness. These blocks 54, 54' are laid in housings 55, 56 in the half-molds. These housings 55, 56 are, as shown here, of a size greater than the size of the blocks 54, 54'. Consequently, even under the pressure of the sheets of glass, blocks 54, 54' always occupy the same volume and do not contribute to sealing the cavity 57 in which the reactive mixture is injected through injector 58. Blocks 54, 54' are fixed by means of lugs 59, 60.

Cavity 57 is defined here by the walls 61 of the lower mold 44, and 62 of the upper mold 45 and by a spacer 63 containing a boss which is housed in a cavity 64 of the lower mold. Such a spacer 63 is only suitable for injection pressures of the reactive mixture, pressures for which sealing can be obtained simply by acting on the compressability of the plastic spacer 63.

For high pressure injections, a lower half mold is used which abuts on the upper half-mold. This, however, no longer enables the same mold to be used for glazings of the same size, but whose thicknesses vary. This spacer 63, which is for example made of aluminum, further enables the exterior geometrical shape of the molded joint to be varied as a function, for example the window for which the glazing is intended. Thus, studs 63' are provided in this case to define holes along the projection produced with the shape of the mold shown here.

The sealing of the glazing is preferably carried out on an edge 65, whose width is, for example equal to 5/10 mm, which projects slightly in relation to blocks 54, 54', and on which the sheet of glass is plated when chambers 47 and 48 are placed under reduced pressure. Due to the inevitable small imperfections of the surface of the glass and of the machining of the mold, the sealing line can in effect, in extreme cases, move on all the points of the edge 65. In order to have a perfectly clean joint edge, it is therefore preferable for the edge to be as fine as possible.

Such a mold can be produced in any easily machinable material such as steel, aluminum or even wood or plexiglass. It is preferably provided with a teflon coating which removes the need to use a unmolding agent if a colored joint is desired, since the polyurethanes condense in approximately 90 seconds and are capable of being tinted.

Finally, with regard to the mold, it should be noted that the reduced pressure can be advantageously maintained on a single surface of the glazing during opening of the mold, then be stopped and replaced with a slight overpressure which assists in the removal of the glazing.

In order to use the method of injection in accordance with the invention, particular care should be taken that the two components are thoroughly mixed in the desired proportions, while keeping a high rate of supply which is compatible with high volume production.

If injection pressures of close to 200 bars are used, we have already indicated that a rising head such as that developed for the RIM method is satisfactory.

Figure 5:
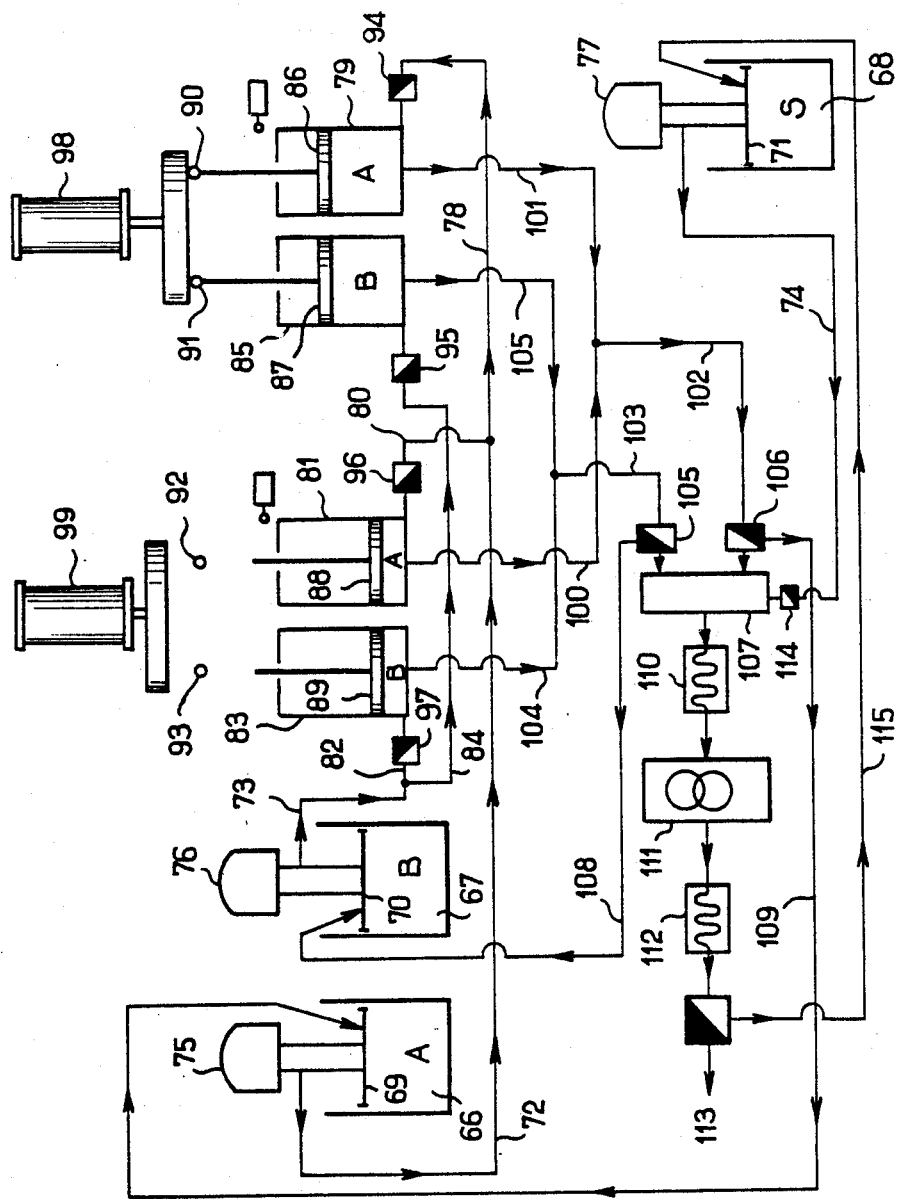
FIG. 5 shows a diagram of a material circuit for the liquid compounds.

For injection pressures lower than 10 bars, a material circuit such as that schematized in FIG. 5 is more particularly preferred.

Upstream, this circuit contains 66, 67 and 68 in which components A and B and a solvent S for the two components, such as, for example, benzene for polyurethane, are respectively stocked. These containers 66, 67 are closed by means of sealed covers 69, 70 and 71. In addition, for products sensitive to oxygenation or hydration, a slight nitrogen or dehydrated air overpressure is provided. This pressurization can also assist in the filling of circuits 72, 73, 74. This filling can also be carried out by means of pumps which are adapted to the components, such as pumps with bearings 75, 76, 77.

Two dosing chambers for volumetric dosing, each grouped in pairs, are associated with each container for components A and B. Circuit 72 for compound A therefore extends at 78 to the dosing chamber 79 and at 80 to the dosing chamber 81. Likewise, circuit 78 for compound B fills chamber 83 by means of channel 82, and chamber 85 by means of channel 84.

Each chamber is closed by means of a floating piston 86, 87, 88, 89, the stem of which, when remounting, comes against a path end 90, 91, 92, 93. The occultation of each path end 90, 91, 92, 93 sets off the closing of an associated electrovalve 94, 95, 96, 97. Each dosing chamber is thus filled independently of the others. The level of the path ends 90, 91, 92, 93 can of course be adjusted to modify the mixture ratios of compound A/compound B.

The order for closing the electrovalves (94, 95) (96, 97), respectively, of a same pair of dosing chambers controls the thrust of the associated jack 98, 99, respectively, which pushes the products out of the chambers through anti-return valves located at the bottom thereof. Product A thus rejoins pipe 102 through pipes 100 or 101, while product B rejoins pipe 103 by passing through pipes 104 or 105. These pipes 102 and 103 are closed by valves 105 and 106 which direct the products either towards the junction block 107 (injection in progress) or by pipes 108 and 109 towards the reserve volumes 66 and 67, for closed circuit operation. If the injection is in progress, compounds A and B pass through a first static mixer 110 and are taken up by the injection pump 111 which delivers the mixture through a second static mixer 112 and then through pipe 113 to the mold.

Turning for a moment to closed circuit operation, it should be pointed out that the junction block 107 is then supplied with solvent through pipe 74 after opening of the valve 114. The static mixers 110, 112 and the pump 111 are thus cleaned and the solvent is sent back through pipe 115 to the container 68 after passage on a decanting sieve.

Such a material circuit is both very sure and very rapid since the length of the pipes is very small, which guarantees arrive of the compounds under the best conditions.

Figure 6:
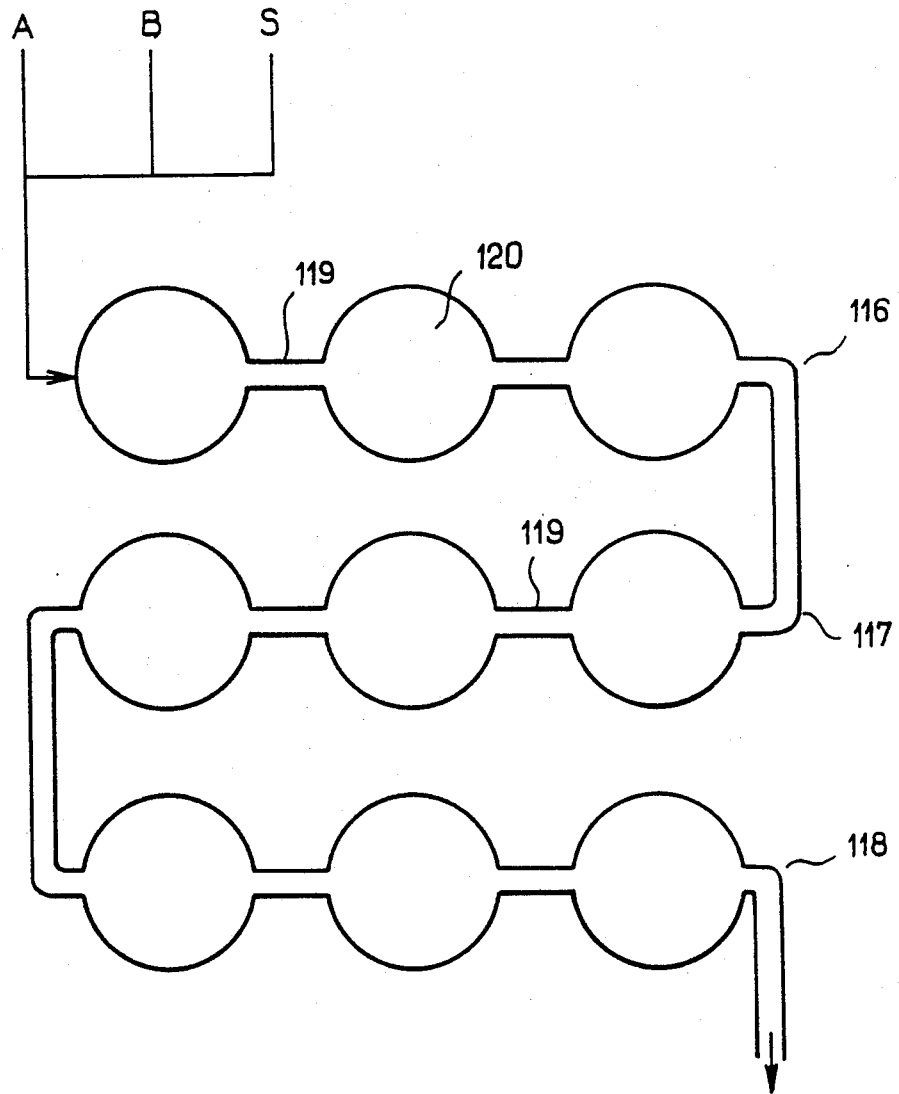
FIG. 6 shows a diagram of a static mixer.

Finally, FIG. 6 illustrates a static mixer adapted for good working of the invention, which contains 3 series 116, 117, 118 of 3 coaxial chambers 120. These chambers communicate through small diameter pipes 119. The mixture of the components is thus released into each chamber 120 and then calendered into pipes 119. It should be noted that the axis position of the chambers removes any preferential path for the mixture.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multiple glazing, comprising:
   at least two sheets of glass separated by an interposed gas space;
   means for maintaining said glass sheets mutually substantially parallel, wherein said means for maintaining comprises a cross-braced frame, said frame comprising a rigid metal profile having a glass contact surface and covered on said glass contact surface with a butyl rubber or isobutylene-based joint, and a peripheral joint and wherein said peripheral joint comprises a plastic adhering in a cohesive manner to said cross-braced frame.

2. The multiple glazing of claim 1, wherein peripheral joint comprises a plastic obtained by in situ condensation of the mixture of at least two liquid reagents.

3. The multiple glazing of claim 1, wherein said peripheral joint extends to cover the entire peripheral part of the external surface of said glazing.

4. The multiple glazing of claim 1, wherein said peripheral joint contains at least one mounting projection.

5. The multiple glazing of claim 4, wherein the shape and dimensions of said mounting projection are independent of the thickness of said gas space and the thickness of said glass sheets.

6. The multiple glazing of claim 1, wherein said plastic of said peripheral joint is polyurethane obtained by injection and in situ polymerization.

7. The multiple glazing of Claim 6, wherein said polyurethane has a thread time of less than 2 minutes.

8. The multiple glazing of Claim 7, wherein said thread time is less than 2 seconds.

9. The multiple glazing of Claim 6, wherein after condensation, said polyurethane has an instanteous hardness of between 50-70 Shore A, an extension to breakage of 400% at 20° C. and a remanent deformation to compression lower than 25% after a test for 24 hours at 70° C.

10. A multiple glazing, comprising:
    at least two sheets of glass separated by an interposed gas space;
    means for maintaining said glass sheets mutually substantially parallel, wherein said means for maintaining comprises the cross-braced frame, said frame comprising a member selected from the group consisting of a butyl rubber cord and a polyisobutylene-based cord, and a peripheral joint, and wherein said peripheral joint comprises a plastic adhering in a cohesive manner to said cross-braced frame.

11. The multiple glazing of claim 10, wherein said peripheral joint comprises a plastic obtained by in situ condensation of a mixture of at least two liquid reagents.

12. The multiple glazing of claim 10, wherein said plastic of said peripheral joint is polyurethane obtained by injection and in situ polymerization.

13. The multiple glazing of claim 10, wherein said polyurethane has a thread time of less than 2 minutes.

14. The multiple glazing of claim 13, wherein said thread time is less than 2 seconds.

15. The multiple glazing of claim 12, wherein after condensation, said polyurethane has an instantaneous hardness of between 50-70 Shore A, an extension to breakage of 400% at 20° C. and a remanent deformation to compression lower than 25% after a test for 24 hours at 70° C.

16. The multiple glazing of claim 10, wherein said perhipheral joint extends to cover to the entire peripheral part of the external surface of said glazing.

17. The multiple glazing of claim 10, wherein said peripheral joint contains at least one mounting projection.

18. The multiple glazing of claim 17, wherein the shape and dimensions of said mounting projection are independent of the thickness of said gas space and the thickness of said glass sheets.

* * * * *

UNITED STATES PATENT AND TRADEMARK OFFICE
CERTIFICATE OF CORRECTION

PATENT NO. : 4,822,649

DATED : APR 18, 1989

INVENTOR(S) : MICHEL CANAUD, ET AL

It is certified that error appears in the above-identified patent and that said Letters Patent is hereby corrected as shown below:

On the title page.
Under Foreign Application Priority Data, the second entry should be corrected to read as follows:

--Dec. 24, 1986 (FR)   France---------------86 18184--

Signed and Sealed this

Twenty-first Day of November, 1989

Attest:

JEFFREY M. SAMUELS

Attesting Officer     Acting Commissioner of Patents and Trademarks